(No Model.)
K. O. E. TROBACH.
PROCESS OF PRODUCING INCANDESCING BODIES FOR ELECTRIC LAMPS.
No. 539,838. Patented May 28, 1895.
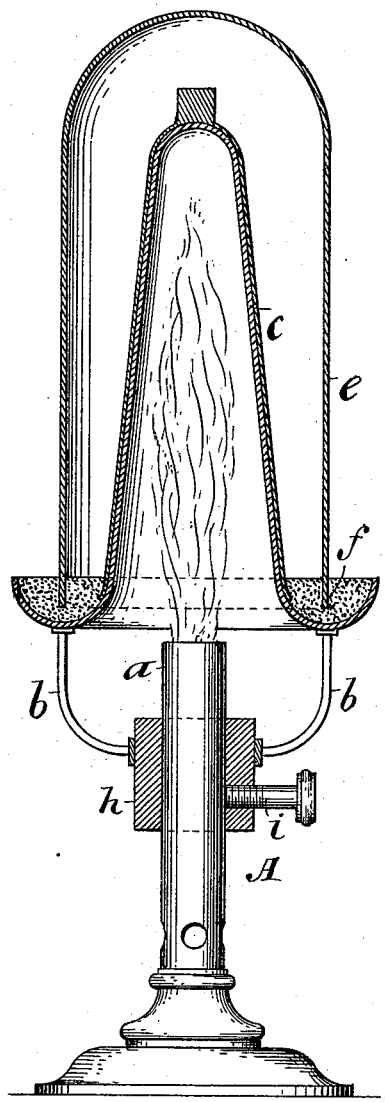
Witnesses
Geo Wadman
Wm A. Pollock
Inventor
Conrad Otto Edward Trobach
By his attorney
Edwin H. Brown

United States Patent Office.

KONRAD OTTO EDUARD TROBACH, OF PANKOW, GERMANY, ASSIGNOR OF ONE-HALF TO SIGMUND BERGMANN, OF NEW YORK, N. Y.

PROCESS OF PRODUCING INCANDESCING BODIES FOR ELECTRIC LAMPS.

SPECIFICATION forming part of Letters Patent No. 539,838, dated May 28, 1895.

Application filed April 18, 1894. Serial No. 507,967. (No specimens.)

*To all whom it may concern:*

Be it known that I, KONRAD OTTO EDUARD TROBACH, of Pankow, near Berlin, in the Empire of Germany, have invented a new and useful Improvement in Processes for Producing Incandescing Bodies for Electric Lamps, of which the following is a specification.

My invention relates to an improved process for producing incandescing bodies for electric lamps and is directed especially toward the production of such bodies which possess the property of great flexibility as well as the possibility of being brought readily to an incandescing state. Moreover my invention embraces the production of incandescing bodies of large areas.

In carrying out my invention, the substances to be employed and ultimately carbonized, such as threads made from carbonizable fibers and textures are subjected not only to a peculiar preparatory treatment, but the carbonization and the subsequent treatment of the carbonized bodies is carried out after a peculiar process. For making incandescing bodies either of a filament like nature, or those having larger surfaces, the substances employed should be of a uniform texture and structure throughout. They may be of a vegetable nature, as for instance vegetable fibers. As mentioned hereinbefore the substances employed for producing the incandescing bodies are after a preliminary treatment, subjected to a sufficiently high degree of heat to carbonize the same.

The accompanying drawing represents a sectional elevation of an apparatus which may be used for carrying out my invention, and shows a body of relatively large surface undergoing the process of carbonization. Preceding, however, this carbonization process the bodies undergo a preparatory treatment which I will now describe.

Textile products often contain variable quantities of salts or other impurities which after the carbonization of the product tend to exert a detrimental influence upon the incandescing qualities of the same. In order to free the fiber from these impurities, the fibers or textures are introduced into a bath made from a solution of twenty to forty per cent. of permanganate of potash in water, where they are left for a period of from thirty to forty minutes. To remove all traces of manganese adhering to the fibers or textures, the latter are then treated with sulphurous acid and finally washed in an abundance of clean water, and allowed to dry. In order to increase the conductivity of the carbon to be subsequently produced by carbonization and also to render it possible to obtain the desired resistance in the carbon or incandescing bodies, the fibers or textures are impregnated with finely divided carbon of high conductivity, which is preferably held suspended in a solution of an acid which yields carbon by dry distillation, such for instance as tartaric or citric acids. This finely divided carbon may be obtained, conveniently, by dissolving an iron or steel, containing a high percentage of carbon, in acid. The iron solution resulting may be removed by filtration and the finely divided carbon well washed with water. The carbon produced is in a very finely divided state and is kept in suspension in the organic acid in which the fibers or textures are thoroughly soaked and with which they become impregnated. The fibers or textures are now ready for carbonization. For this purpose they are introduced into a vessel or apparatus from which the air is excluded. The contents are then subjected to a high degree of heat, sufficient for their carbonization. As no air is admitted this process becomes one of dry distillation in the presence of the gases resulting from the decomposition of the fiber or texture. As a consequence of this, the fibers or textures are loosened and expanded giving them a spongy appearance while the carbon retains the same flexibility that has been peculiar to the substance before carbonization. For effecting this carbonization the body to be carbonized may be suspended in a vessel made of non fusible material and the latter placed in a muffler and subjected to a high degree of heat. If hollow or bell shaped incandescing bodies are to be made, it is well to employ during carbonization a device provided with a core having the shape the incandescing body is to have when finished. The texture or fabrics to be carbonized is then placed over or around the core and the air excluded by a suitable cover. I have shown such an apparatus in the accompanying drawing.

A represents a lamp for supplying the heat for carbonizing the body. At $h$ is shown a collar fitting over, and through which the burner $a$ of the lamp extends. It serves to support the incandescing body and its appurtenances and can be set at any height and secured in such position by a thumb screw $i$ engaging with the collar $h$ and impinging against the burner $a$. Secured to and extending upward from the collar $h$ are stanchions or arms which support at their upper extremities a core $c$ whose lower end is extended upwardly to form a channel. This core is made of refractory material and has a configuration of outer surface corresponding with that which it is desired the interior of the incandescing body should possess. Over this core is placed the texture or fabric to be carbonized. Exterior to this again is a hood or cover $e$ into which the core $c$ projects but between which and the core there is an interspace as represented. To exclude the atmosphere from this interspace, the hood or cover $e$ rests in the channel formed by the lower part of the core, the channel being filled with some refractory material $f$, as powdered fire brick. This seal effectually prevents the entrance of the external atmosphere during the carbonization of the body seated on the core. Heat is then applied by the lamp which may be either a Bunsen burner or a blast lamp and the carbonization of the body is effected through dry distillation. If the operation is performed in a muffler, a similar device may be used omitting the lamp, heat being applied in some other way.

What I claim as new, and desire to secure by Letters Patent, is—

1. The process of producing spongy and flexible incandescing carbon bodies for electric lamps, consisting in immersing the substance to be carbonized such as vegetable textures in an acid or acids as citric acid which will give off carbon when subjected to dry distillation, in which acid is suspended finely divided carbon with which the substance to be carbonized becomes thoroughly permeated and then carbonizing said substance, substantially as specified.

2. The process of producing spongy and flexible incandescing carbon bodies for electric lamps consisting in immersing the substances to be carbonized such as vegetable texture, in an acid or acids, as citric acid, which will give off carbon when subjected to dry distillation, in which acid is suspended finely divided carbon with which the substance to be carbonized becomes strongly permeated, and then carbonizing said substances with exclusion of the atmospheric air and in presence of the gases produced by distillation, substantially as specified.

3. The process of producing spongy and flexible incandescing carbon bodies for electric lamps consisting in subjecting the substance to be carbonized to a preliminary purifying treatment then immersing the same in an acid or acids which will give off carbon when subjected to dry distillation in which acid is suspended finely divided carbon with which the substance to be carbonized becomes thoroughly permeated and subsequently carbonizing said substance, substantially as specified.

In witness whereof I have hereunto set my hand in presence of two witnesses.

KONRAD OTTO EDUARD TROBACH.

Witnesses:
T. N. SENBEL,
W. HAUPT.